3,234,298
SELECTIVE HYDROGENATION
Wouter C. van Zijll Langhout and Peter van 't Spijker, The Hague, and Gerardus J. F. Stijntjes, Amsterdam, Netherlands, assignors to Shell Oil Company, New York, N.Y., a corporation of Delaware
No Drawing. Filed Sept. 27, 1961, Ser. No. 141,004
Claims priority, application Netherlands, Oct. 21, 1960, 257,123
4 Claims. (Cl. 260—677)

The invention relates to a process for the catalytic selective hydrogenation of light, diene-containing cracked hydrocarbon oils.

It is well known that diene-containing cracked gasoline and other light cracked hydrocarbon oils can be selectively hydrogenated by passing these starting materials over a suitable hydrogenation catalyst in the presence of hydrogen.

Particularly suitable catalysts are those which contain nickel or molybdenum supported on a carrier (e.g. $Al_2O_3$ or a material containing $Al_2O_3$, $BaSO_4$, $BaCO_3$, etc.). These catalysts are preferably first sulfided before use. Selective hydrogenation catalysts are described in U.S. Patent No. 2,674,634 to Greensfelder et al. and U.S. Patent No. 2,402,493 to Greensfelder et al.

In the selective hydrogenation processes the dienes (including cyclopentadienes) are hydrogenated to the corresponding alkenes (cycloalkenes). It should be observed that in many cases it is necessary to remove alkadienes and similar compounds since owing to the presence of these very reactive unsaturated compounds the light cracked hydrocarbon oils are extremely unstable and consequently usually unsuitable for use as, for example, a motor fuel component. Such very reactive compounds occur in relatively large amounts in gasolines and kerosenes obtained by very severe thermal cracking.

With regard to operating conditions in these selective hydrogenation processes, the temperatures which are used are generally substantially lower than those employed in complete hydrogenations, hydrodesulfurizations and the like. In selective hydrogenation, the temperature does not exceed 280° C. and is usually not in excess of the upper limit of 200° C. The temperature is preferably in the range 70° to 150° C.

In most cases the pressures do not exceed 100 kg./sq. cm. abs. and are generally in the range 10 to 80 kg./sq. cm. abs. The liquid hourly space velocity of the fresh feed is usually in the range 0.5 to 5 kg. of liquid starting material per liter of catalyst per hour and preferably in the range of 1 to 3 kg./h.l., while the ratio of the amount of hydrogen-containing gas to the total amount of hydrocarbon oil is usually in the range 50 to 300 std. cu. m./kg.

If desired, a portion of the treated oil may be recycled and/or a suitable diluent oil (cooling oil) added. Mixing of the added oil with the oil to be hydrogenated may be effected before the first (or sole) catalyst bed and/or at one or more points between the catalyst beds (when more than one bed is used).

The reaction conditions are preferably such that the oil to be refined remains at least partially liquid during the reaction viz. at least 50% by weight thereof.

In practice the hydrogen gas used is a gas mixture containing hydrogen. It should preferably contain not less than 60% by volume of hydrogen. Generally the hydrogen-containing gases, for example, obtained in a catalytic reforming of gasoline fractions are very suitable.

It has now been found, however, that in selective hydrogenation certain hydrogen-containing gases which may be readily used in conventional complete hydrogenations and hydrodesulfurizations give rise to very undesirable phenomena, which do not occur with other hydrogen-containing gases, viz. an increase in the sulfur content of the oil and a very steep decline in the activity of the catalyst.

Closer investigation has shown that these undesirable phenomena are caused by excessively high concentrations of hydrogen sulfide in the reaction mixture and that they do not occur if care is taken to ensure that the amount of hydrogen sulfide in the reaction mixture is sufficiently small.

The invention therefore provides a process for the catalytic selective hydrogenation of light, diene-containing cracked hydrocarbon oils at temperatures below 280° C. in the presence of hydrogen-containing gas, and wherein the total amount of hydrogen sulfide present in the reaction mixture does not exceed 0.1 kg. per 1000 kg. of total hydrocarbons present and preferably does not exceed 0.01 kg. per 1000 kg. of hydrocarbons.

Reaction mixture as used herein includes the cycle gas, any fresh hydrogen-containing gas, fresh hydrocarbon feed, recycle hydrocarbon, if any, diluent, oil if any, and the like. Thus, in the process of the invention, should the $H_2S$ content of the reaction mixture be excessive, then $H_2S$ should be removed from one or more of the component feed streams. It is generally more convenient and feasible to treat the recycle gas and/or makeup hydrogen gas for these streams will usually be richest in $H_2S$. The treatment may be done in a manner known per se, e.g., by absorbing the $H_2S$ in an aqueous solution of one or more phosphates, NaOH, KOK, or an organic amine.

After treatment with an absorption liquid, the stream from which $H_2S$ has been wholly or substantially removed is preferably water-washed to remove any entrained droplets of absorption liquid. As a result of the water-wash, the treated stream is generally saturated with water. This is permissible for although $H_2S$ interferes with the process even in a relatively low concentration, the presence of water vapor is innocuous and no drying is necessary.

It is noticeable and surprising that the above-mentioned undesirable effects caused by $H_2S$ (and this is particularly true of the decline in activity) also occurs in catalysts which are sulfided before use, e.g., in nickel catalysts supported on a carrier which, before being used as catalysts for selective hydrogenation, are sulfided with $H_2S$ or sulfur-containing hydrocarbon oils.

The present process is particularly important in the selective hydrogenation of the gasolines (and kerosenes) obtained as by-product in the production of normally gaseous alkenes (in particular ethene and propene), by several thermal cracking of hydrocarbon oil. These cracking reactions are usually carried out in such a way that more than 50% by weight of the starting hydrocarbon oil is converted to compounds having four or less carbon atoms in the molecule. The by-product formed in this cracking is a gasoline which usually contains more than 30% by weight and frequently more than 60% by weight of aromatic compounds and a substantial content of alkenes having a relatively high octane number. Consequently, such gasolines have high octane numbers. It is also an advantage that in most cases these gasolines are practically free from sulfur, viz. they have a content of sulfur compounds (calculated as elementary sulfur) which is considerably lower than 0.1% by weight.

There are, however, relatively much more highly reactive compounds such as dienes (including those of the cyclopentadiene type), alkynes and compounds of the styrene type present, and it is often very desirable to remove these highly reactive compounds by selective hydrogenation, since owing to their presence, the gasolines are extremely unstable and hence usually unsuitable for use, for example, as a motor fuel component.

In practice, the severe thermal cracking for the production of lower alkenes is preferably carried out in pipe stills and in the presence of steam. This steam cracking is usually carried out at temperatures in the range of approximately 550° C. to approximately 900° C., preferably from 750° C. to 800° C., and preferably at a pressure below approximately 5 atm. abs. Use is generally made of 0.1–10 parts by weight of steam, preferably about 1 part by weight per part by weight of starting material. The severe cracking may, however, also be carried out in other ways, e.g., by contacting the starting material to be cracked with a very highly heated finely-divided solid material such as sand, or with a very highly heated molten salt.

Starting materials for the severe thermal cracking are preferably low boiling hydrocarbon oils which are relatively rich in aliphatic hydrocarbons. Consequently, straight-run gasoline fractions are very suitable.

Hydrocarbon mixtures other than the gasolines and kerosenes referred to above can also be selectively hydrogenated according to the present invention. For example, diene-containing higher-boiling olefinic fractions (e.g., the higher-boiling olefin fractions, rich in $C_{14}$–$C_{18}$ olefins, obtaned in the cracking of high-boiling hydrocarbon fractions). Thus, suitable feeds for the process of the invention are diene-containing light cracked hydrocarbon oils within the range from $C_3$ hydrocarbons to a final boiling point (ASTM) of not more than 375° C.

*Example*

The starting material was a gasoline obtained as by-product in the production of ethene and propene by steam cracking of a straight-run hydrocarbon oil having a final boiling point of 230° C. The said gasoline was free from naphthenic hydrocarbons and contained 11% by weight of dienes, 10% by weight of alkenes, 36% by weight of aromatic hydrocarbons and 43% by weight of saturated hydrocarbons.

Other properties of the gasoline were: boiling range 41–180° C., (ASTM), bromine number 55 g./100 g. (McIlhiney's method), maleic anhydride number 110 mg./g. (Ellis and Jones' method), sulfur content 15 p.p.m. (p.p.m.=parts by weight per $10^6$ parts by weight). Owing to the high diene content, the gasoline was very unstable.

The gasoline was passed over a catalyst together with pure hydrogen at a temperature of 100° C. to 110° C., a pressure of 40 atm. abs. and a liquid hourly space velocity of 1 kg./h.l. The amount of hydrogen was 170 std. 1./kg. of gasoline. The catalyst used was a nickel (10% Ni) supported on alumina, the catalyst having been sulfided with a straight-run naphtha (0.05% of sulfur).

The product had a bromine number of 38 g./100 g. and a maleic anhydride number of 1.0 mg./g., showing that the hydrogenation was quite selective. The sulfur content was 15 p.p.m. When the experiment was continued for 825 hours the maleic anhydride number and bromine number remained constant within the errors of observation.

The hydrogen was then replaced by a hydrogen-hydrogen sulfide mixture containing 0.7% by vol. of $H_2S$. Other conditions were carefully kept the same. The total content of $H_2S$ in the streams supplied to the reactor was now 1.82 kg. per 1000 kg. of gasoline. The bromine number and the maleic anhydride number of the reaction product rose almost immediately to 51 g./100 g. and 108 mg./g., showing that there was practically no further hydrogenation. The reaction product freed of $H_2S$ contained 515 p.p.m. of sulfur.

After reversion to the original $H_2S$-free gas the catalyst slowly recovered. After 100 hours the bromine number of the product was 45 g./100 g. and the maleic anhydride number 4.7 mg./g. This shows that the activity and selectivity practically returned to the original good level. The sulfur content was again 15 p.p.m.

In a subsequent experiment (the other conditions remaining unchanged) use was made of hydrogen containing 0.002% by vol. of $H_2S$. The total content of $H_2S$ in the reaction mixture was therefore 0.0052 kg./1000 kg. of gasoline. The maleic anhydride number was originally 1.0 mg./g. and the bromine number 35 g./100 g.; after 60 hours they had risen to 1.6 mg./g. and 40 g./100 g. respectively, showing that there was a decline in activity which was slight and usually still acceptable. The sulfur content of the product was originally 15 p.p.m. and after 60 hours 17 p.p.m.

In another experiment (conditions otherwise remaining unchanged) a gas was used containing 0.008% by vol. of $H_2S$, the remainder consisting of hydrogen. The total content of $H_2S$ in the reaction mixture was now 0.02 kg./1000 kg. of gasoline.

The maleic anhydride number was originally 1.0 mg./g. and the bromine number 35 g./100 g.; after 60 hours the maleic anhydride number had gradually risen to 3.0 mg./g., whereas the bromine number was 41 g./100 g., showing that an $H_2S$ content of 0.02 kg./1000 kg. of gasoline usually results in practice in an undesirably rapid decline in the catalyst activity. The sulfur content of the product was originally 15 p.p.m. and after 60 hours 21 p.p.m.

We claim as our invention:

1. A process for the selective hydrogenation of a diene-containing hydrocarbon oil boiling within the range from $C_3$ hydrocarbons to a final boiling point of no more than 375° C. to convert dienes to alkenes which comprises contacting said hydrocarbon oil, a hydrogen-containing gas, and hydrogen sulfide with a selective hydrogenation catalyst selected from the group consisting of sulfided nickel on alumina and sulfided molybdenum on alumina at a temperature in the range from 70° to 150° C. and a pressure in the range from 10 to 100 kg./sq. cm. abs., the total amount of hydrogen sulfide present being not more than 0.1 kilogram of hydrogen sulfide per 1000 kilograms of total hydrocarbons present.

2. The process according to claim 1 wherein the diene-containing oil is a cracked gasoline, and the total amount of hydrogen sulfide is not more than 0.01 kilogram of hydrogen sulfide per 1000 kilograms of total hydrocarbon present.

3. The process according to claim 1 wherein the selective hydrogenation is carried out at a pressure in the range from 10 to 80 kg./sq. cm. abs. and with a catalyst comprising sulfided nickel on alumina.

4. The process according to claim 3 wherein the diene-containing oil is a cracked gasoline and the total amount of hydrogen sulfide is not more than 0.01 kilogram of hydrogen sulfide per 1000 kilograms of total hydrocarbon present.

References Cited by the Examiner

UNITED STATES PATENTS

| | | | |
|---|---|---|---|
| 2,402,493 | 6/1946 | Greensfelder et al. | 260—683 |
| 2,511,453 | 6/1950 | Barry | 260—683 |
| 2,638,438 | 5/1953 | Hoffmann et al. | 260—683 |
| 2,674,634 | 4/1954 | Greensfelder et al. | 260—683 |
| 2,934,574 | 4/1960 | Viland | 260—683 X |
| 3,004,914 | 10/1961 | White | 260—683 |
| 3,009,969 | 11/1961 | Spencer et al. | 260—683 X |
| 3,113,983 | 12/1963 | Kirsch et al. | 260—677 |

ALPHONSO D. SULLIVAN, *Primary Examiner.*